(12) United States Patent
Santacapita et al.

(10) Patent No.: US 10,613,354 B2
(45) Date of Patent: Apr. 7, 2020

(54) PROTECTIVE COVERING ATTACHABLE TO EYEWEAR (71) Applicants: Mia Santacapita, Shelton, CT (US); Paul Santacapita, Shelton, CT (US)

(72) Inventors: Mia Santacapita, Shelton, CT (US); Paul Santacapita, Shelton, CT (US)

( * ) Notice: Subject to any disclaimer, the term of this patent is extended or adjusted under 35 U.S.C. 154(b) by 0 days.

(21) Appl. No.: 15/994,410

(22) Filed: May 31, 2018

(65) Prior Publication Data

US 2018/0348546 A1 Dec. 6, 2018

Related U.S. Application Data (60) Provisional application No. 62/603,493, filed on Jun. 2, 2017.

(51) Int. Cl.
G02C 9/04 (2006.01)
G02C 7/16 (2006.01)
G02C 11/00 (2006.01)

(52) U.S. Cl.
CPC .................. G02C 9/04 (2013.01); G02C 7/16 (2013.01); G02C 11/12 (2013.01)

(58) Field of Classification Search
CPC ... G02C 9/02; G02C 9/00; G02C 9/04; G02C 7/16; G02C 11/12
See application file for complete search history.

(56) References Cited

U.S. PATENT DOCUMENTS

| 1,759,041 | A | * | 5/1930 | Dawes | G02C 7/16 |
| | | | | | 2/13 |
| 2,762,050 | A | * | 9/1956 | Bricker | G02C 9/04 |
| | | | | | 2/13 |
| 3,237,204 | A | * | 3/1966 | Honsaker | A61F 9/045 |
| | | | | | 2/13 |
| 4,446,571 | A | * | 5/1984 | Ross | G02C 9/00 |
| | | | | | 2/13 |
| 4,543,667 | A | * | 10/1985 | Garbutt | G02C 9/00 |
| | | | | | 2/13 |

(Continued)

FOREIGN PATENT DOCUMENTS

FR 2553905 A1 * 4/1985 ............... G02C 9/00

OTHER PUBLICATIONS

Key West Visor Sunglasses. See website: https://www.anypromo.com/outdoor-leisure/sunglasses-straps/key-westvisor-sunglasses-p737621, 6 pages, last accessed on May 31, 2018.

(Continued)

Primary Examiner — Charlie Y Peng (57) ABSTRACT

A crescent-shaped apparatus for attachment to eyeglasses (e.g., prescription glasses, sunglasses, etc.) to provide a protective covering for lenses of the eyeglasses and the eyes of the wearer. The apparatus includes a body and one or more attachment components. The attachment components are configured to couple to a portion of the eyeglasses (e.g., the pair of arms of the eyeglasses) and secure a portion of the body in a position above the lenses of the eyeglasses. Advantageously, upon coupling with the eyeglasses, a portion of the body provides an overhang that protects the lenses of the eyeglasses and the eyes of the wearer from various weather-related elements, such as rain, snow, and sun.

10 Claims, 7 Drawing Sheets

FIG. 4

(56) References Cited

U.S. PATENT DOCUMENTS

| | | | | | |
|---|---|---|---|---|---|
| 4,606,453 | A | * | 8/1986 | Burns | A45C 11/04 2/13 |
| 5,113,529 | A | * | 5/1992 | Carr | G02C 7/16 2/12 |
| 5,438,378 | A | * | 8/1995 | Blatter | G02C 7/16 2/13 |
| 5,553,321 | A | * | 9/1996 | Cassel | A45C 11/04 2/13 |
| D661,724 | S | * | 6/2012 | Horn | D16/340 |

OTHER PUBLICATIONS

Decorated Eyeglass Visor Running Horse. See website: htttps://www.etsy.com/listing/259839026/decorated-eyeglassvisor-running-horse, 4 pages, last accessed on May 31, 2018.

* cited by examiner

PROTECTIVE COVERING ATTACHABLE TO EYEWEAR

CROSS-REFERENCE TO RELATED APPLICATION

This application claims the benefit of U.S. Provisional Patent Application No. 62/603,493, filed Jun. 2, 2017, titled "Vision vEYESor (a.k.a. Vision Visor)", the entirety of which is hereby incorporated by reference herein.

TECHNICAL FIELD

The present disclosure relates generally to a wearable visor, and, more particularly, to a visor including one or more components to attach to eyewear to provide a covering for the eyewear and the eyes of a user.

BACKGROUND

Millions of people wear eyewear as part of their daily routine. The eyewear, such as eyeglasses and sunglasses, is worn by a person to provide improved vision or visibility. In many cases, prescription eyeglasses must be worn by an individual in all facets of their daily life. As such, eyewear may be worn in many different outdoor settings experiencing a variety of different weather conditions. For example, a person who wears prescription eyeglasses every day may be forced to wear their eyeglasses in all kinds of weather conditions, such as direct sunlight and various forms of precipitation including rain, sleet, hail, and snow. As a result, the eyeglass lenses may become dirty or otherwise impacted by falling precipitation. A significant nuisance is created wherein the wearer is forced to continually clean the lens portion of the glasses. In addition, the wearer of the eyeglasses may wish to shade his or her eyes from intense sunlight or other harsh sources of lighting, as needed for safety and comfort.

BRIEF DESCRIPTION OF THE DRAWINGS

The present disclosure will be more readily understood from the detailed description of exemplary implementations presented below considered in conjunction with the attached drawings, of which.

It is to be understood that the attached drawings are for purposes of illustrating the concepts of the disclosure and may not be to scale, and are not intended to be limiting in terms of the range of possible shapes and/or proportions.

DETAILED DESCRIPTION

The present disclosure relates to an apparatus for attachment to eyeglasses (e.g., prescription glasses, sunglasses, etc.) to provide a protective covering for lenses of the eyeglasses. The apparatus, also referred to as an eyeglass visor, includes a body and one or more attachment portions configured to couple to a portion of the eyeglasses and secure a portion of the body in a position above the lenses of the eyeglasses. Advantageously, upon coupling with the eyeglasses, a front portion of the body overhangs a frame portion of the eyeglasses and protects the lenses of the eyeglasses and the eyes of the wearer from various weather-related elements, such as rain, snow, and sun. Another advantage is achieved wherein the attachment portions are configured to enable application and removal of the apparatus from the eyeglasses without requiring removal of the eyewear from the user's head.

In one embodiment, the body of the eyeglass visor includes a portion configured to provide a protective overhang for the lenses of a pair of eyeglasses of a wearer. In one embodiment, the body is generally crescent-shaped. In one embodiment, the body has the shape of a single curve that is broad in the center and tapers to a point each of a first end of the body and a second end of the body.

In one embodiment, positioned at the first end and the second end of the body are respective attachment components (e.g., a first attachment component arranged at the first end of the body and a second attachment component arranged at the second end of the body). The attachment components are devices configured to fasten, couple, or attach the ends of the body of the eyeglass visor to respective arms (e.g., the portion on the respective sides of a frame of the eyeglasses that extends from a hinge and over ears of a wearer) of a pair of eyeglasses.

In one embodiment, the attachment components are configured to be transitioned from an open position to a closed position. In the closed position, the attachment component securely clips, attaches, or couples to at least a portion of the respective arms of the eyeglasses. In one embodiment, a first arm (also referred to as a "temple") of the eyeglasses may be arranged within the attachment component in the open position such that the body of the eyeglass visor is positioned above and overhanging the lenses of the eyeglasses. In an embodiment, when the front portion of body is placed in the desired position to protect the lenses of the eyeglasses from weather-related conditions (e.g., rain, snow, sleet, sun, etc.), the first and second attachment components are transitioned from the open position to the closed position to securely "lock" the attachment components around or in attachment with the arms of the eyeglasses. Advantageously, the attachment components are configured to be adjustable to fit and attach to a variety of eyeglass types, shapes, and sizes.

In one embodiment, the attachment components are tension clip devices (e.g., spring-loaded clips) that removably latch onto the arms of the eyeglasses. The attachment component may be any suitable device configurable to clip, attach or couple to the arms of the eyeglasses in an easy to use manner such that the eyeglasses do not need to be removed in order to clip the eyeglass visor to the eyeglasses. For example, the attachment components may be a clip, clasp, clamp, magnet, rivet, spring, or a combination thereof.

Figure 1:
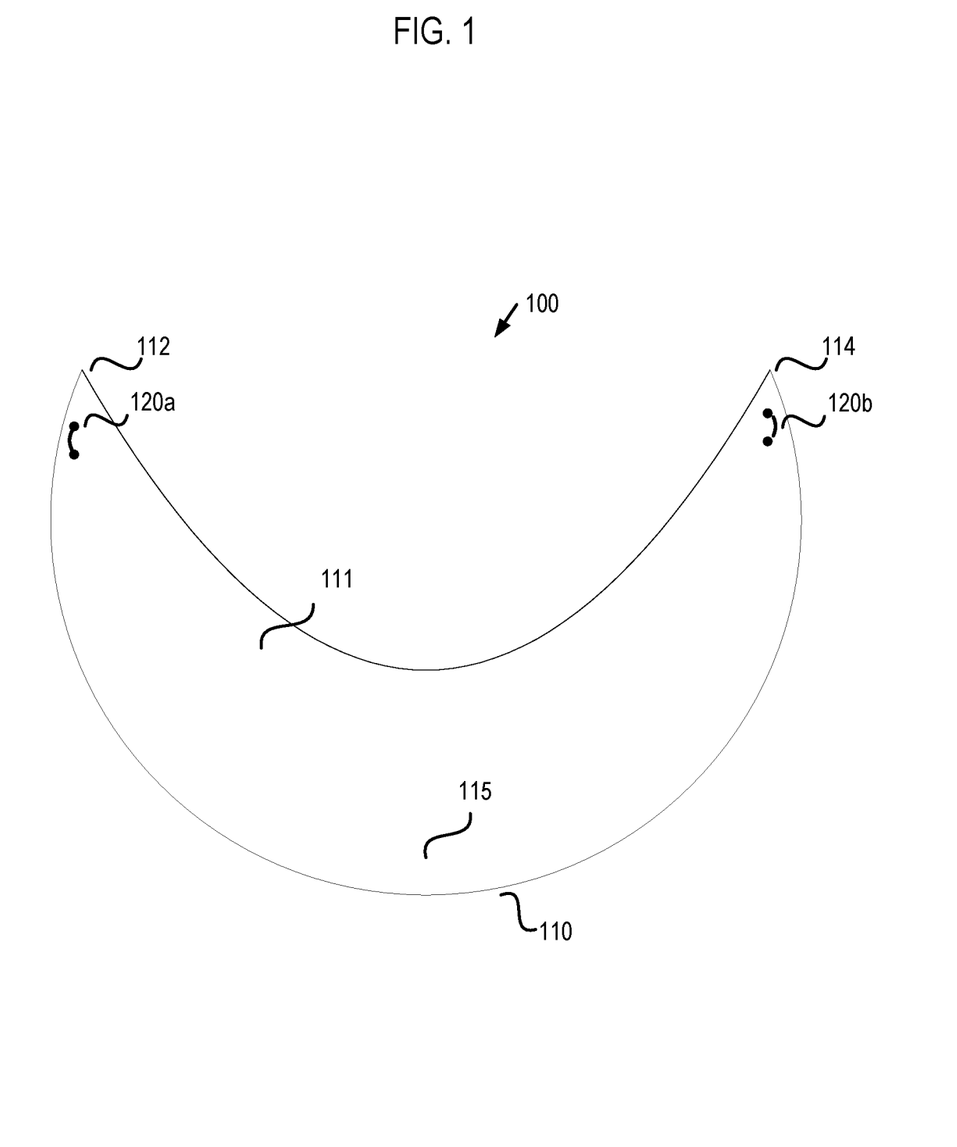
FIG. 1 shows a top view of an attachable visor including a body portion to provide a protective covering for a lens portion of eyeglasses of a wearer, according to implementations of the present disclosure.

FIG. 1 illustrates a top view of the eyeglass visor apparatus 100, according to embodiments of the present disclosure. As illustrated, the eyeglass visor 100 includes a body 110 including a front portion 115, a first end 112 and a second end 114. In the example, shown, the body 110 is crescent-shaped and configured for attachment to eyeglasses (not shown) such that a portion of the body 110 provides a protective covering for a lens portion of the eyeglasses and the eyes of the wearer. The body 110 may be composed of any suitable, resilient material, such as plastic. In one embodiment, at least a portion of the body 110 may be composed of a water-resilient or waterproof material.

In an embodiment, the first end 112 of the body 110 includes an attachment component for attaching to a portion of an arm of the eyeglasses. FIG. 1 shows a top surface 111 of the body 110 and fastener components 120a, 120b arranged at each of the first end 112 and second end 114 of the body 110. In one embodiment, the body 110 includes two through holes configured to receive or accept a fastener for coupling with an attachment component (not shown in FIG. 1). In one example, the fastener includes an elasticized string (e.g., a tension string) or other similar mechanism threaded between the two holes such that the fastener engages with the attachment component on the underside of the body 110. It is noted that any suitable type of fastener may be used (e.g., a magnet, a screw, or rivet assembly, a button, etc.) to connect the attachment component to the body 110. In one embodiment, the body 110 may be fabricated to include an integral component (e.g., a magnet, a threaded bore, etc.) that is configured to couple or attach to the attachment component positioned on the underside of the body 110 of the eyeglass visor 100.

Figure 2:
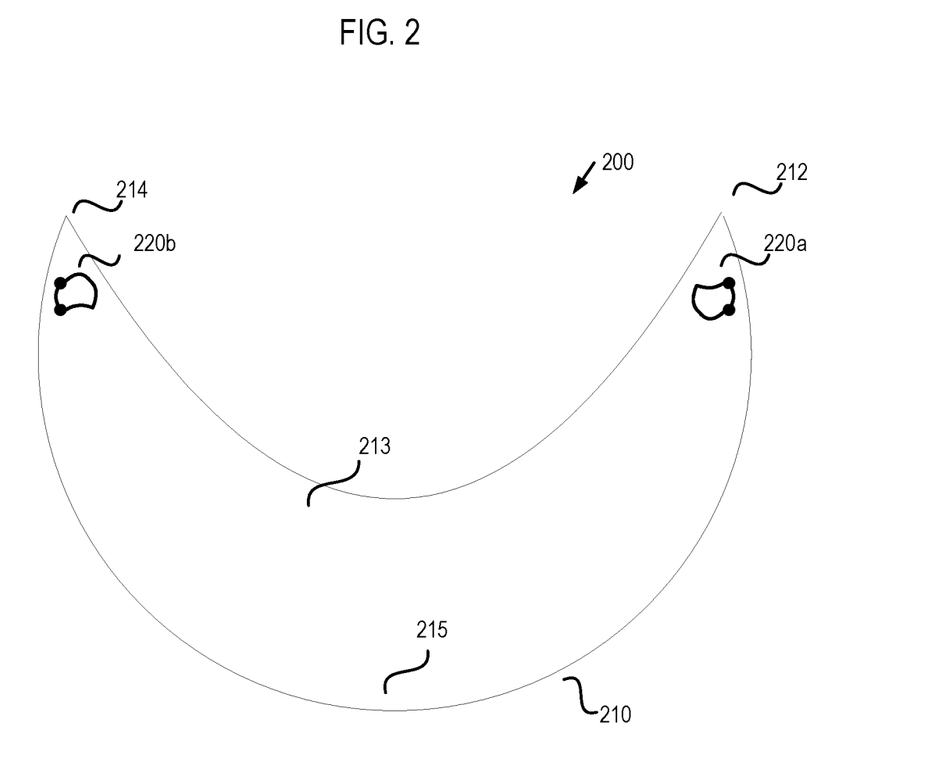
FIG. 2 illustrates a bottom view of an attachable visor including a body component and attachment components for use in attaching to eyeglasses to provide a protective covering for a lens portion of the eyeglasses, according to implementations of the present disclosure.

FIG. 2 illustrates a bottom view of an example embodiment of the eyeglass visor 200. As shown in FIG. 2, the eyeglass visor 200 includes a body 210 having a front portion 215, a first end 212 and a second end 214. The underside 213 of the eyeglass visor 200 includes a first attachment component 220a and a second attachment component 220b. In one embodiment, the first attachment component 220a is arranged proximal to or fixed at a first end 212 of the body 210. In one embodiment, the second attachment component 220b is arranged proximal to or fixed at a second end 214 of the body 210.

In one embodiment, the first attachment component 220a and the second attachment component 220b are respective devices configured to attach or couple to respective arms of eyeglasses. As shown in the example of FIG. 2, the first attachment component 220a and the second attachment component 220b are spring-loaded clamps or clips configured to transition from an open position to a closed position. When the attachment components are in the closed position, a secure engagement with the arms of the eyeglasses is formed, thereby holding a portion of the visor body 210 in place above the frames/lenses of the eyeglasses. Although FIG. 2 illustrates a clamp or clip as the attachment component, it is to be appreciated that alternative attachment types may be employed (e.g., magnetic assemblies, etc.)

Figure 3:
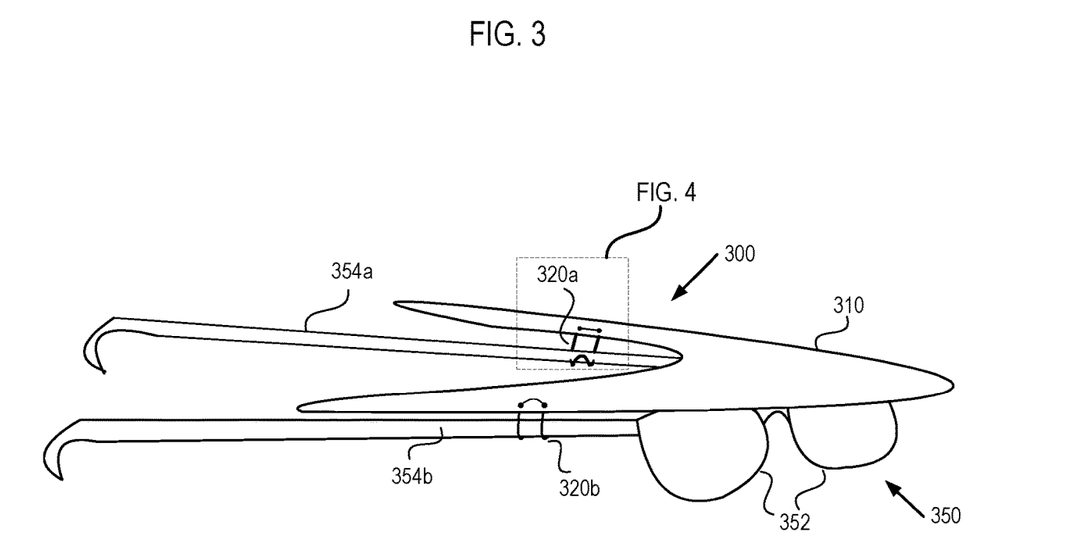
FIG. 3 illustrates a side perspective view of an example attachable visor attached or mounted on a pair of eyeglasses, according to implementations of the present disclosure.

FIG. 3 illustrates an example eyeglass visor 300 attached to eyeglasses 352. As shown in FIG. 3, a first attachment component 320a in a closed position securing a first arm 354a of eyeglasses 350. FIG. 3 also shows a second attachment component 320b in a closed position securing a second arm 354b of the eyeglasses 350. As shown in FIG. 3, when the attachment components 320a, 320b are attached or coupled to the arms 354a, 354b, a portion of a body 310 of the eyeglass visor 300 is positioned above and overhanging the lenses 352 of the eyeglasses 350. In one embodiment, the body 310 of the eyeglass visor 300 may include a tension string (or similar structure) threaded between and through two holes of the body 310 such that the string fastens the respective attachment components 320a, 320b to the body 310. It is noted that alternative structures and assemblies may be used to form a secure engagement between the attachment components 320a, 320b and the body 310.

Advantageously, the eyeglass visor 300 may be positioned to securely and easily clip to the eyeglasses 350 and provide a protective cover for the lenses 352 of the eyeglasses 350, thereby achieving protection for the lenses and the eyes of the wearer from external elements such as rain, sleet, hail, snow, and sun. Another advantage is achieved in that the eyeglass visor 300 may be attached to any type, size, and shape eyeglasses by having attachment components 320a, 320b that can be securely fastened, attached, or coupled to different arms of different eyeglasses without requiring removal of the eyewear from the user's head.

Figure 4:
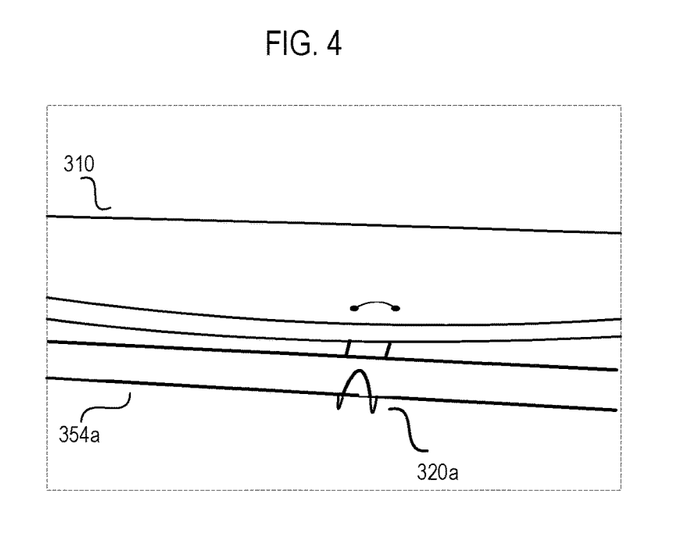
FIG. 4 illustrates an exploded view of a portion of the example attachable visor of FIG. 3, according to implementations of the present disclosure.

FIG. 4 illustrates an exploded view of a portion of FIG. 3, as shown. In one embodiment, the attachment component 320b is clipped or otherwise securely attached to the arm 354b of the eyeglasses. FIG. 4 shows the attachment component 320b (e.g., a spring loaded clip) in the closed position in secure engagement with the arm 354b. It is noted that any suitable type of clip or other similar device may be used to secure the eyeglass visor to the eyeglasses, in a manner that can be easily clipped on or off by transitioning the attachment component 320b between the closed and open positions. As shown in FIG. 4, in an embodiment, the attachment component 320b may be arranged at an end of the body 310, such that a front portion of the body 310 (shown in FIG. 3) extended over and above the lenses 352 of the eyeglasses 350.

Figure 5:
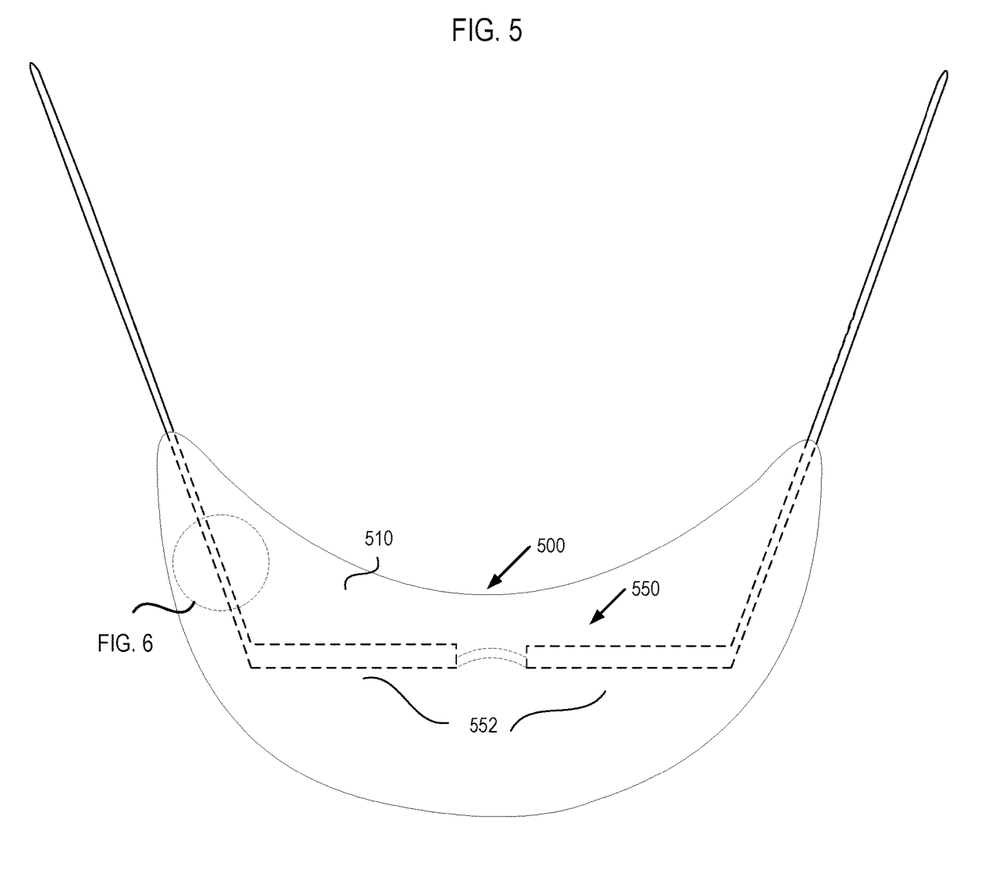
FIG. 5 illustrates a top view of an example attachable visor including a body portion providing a protective covering for a lens portion of eyeglasses, according to implementations of the present disclosure.

FIG. 5 illustrates a top view of an example eyeglass visor 500, according to embodiments of the present disclosure. In FIG. 5, a portion of the eyeglasses 550 that covered by the eyeglass visor 500 and, therefore, not visible from the top view of FIG. 5, are depicted in dashed lines. As shown in FIG. 5, the eyeglass visor 500 is coupled to the eyeglasses 550 and provides a protective covering for the lenses of the eyeglasses 550. Although FIG. 5 may not be to scale, a least a portion of the body 510 of the eyeglass visor 500 is configured to overhang the lenses 552 of the eyeglasses 550 when the eyeglass visor 500 is clipped or attached to the eyeglasses 550. In one embodiment, the body 510 of the eyeglass visor 500 may be configured in a variety of different sizes (e.g., small, medium, large), thicknesses, colors, and shapes.

Figure 6:
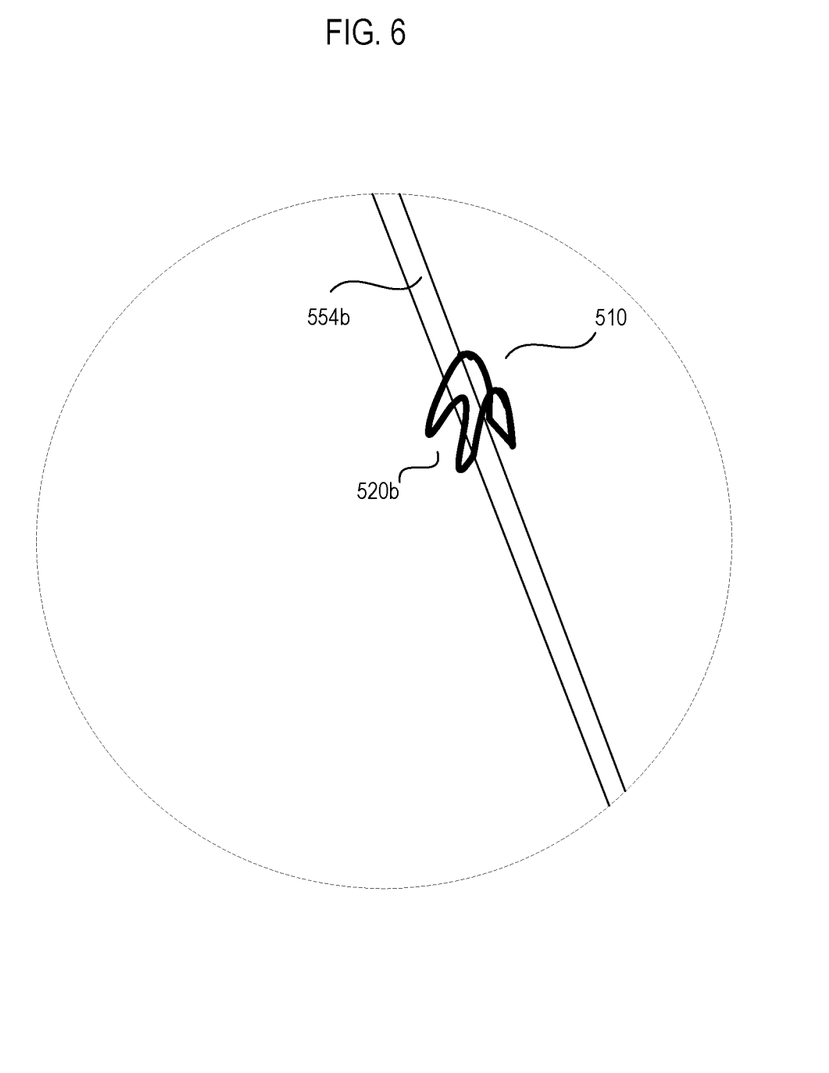
FIG. 6 is an exploded bottom view of a portion of the example attachable visor of FIG. 5, the exploded bottom view showing an example attachment component securing the attachable visor to a first arm of a pair of eyeglasses, according to implementations of the present disclosure.

FIG. 6 illustrates an exploded view of an underside of the eyeglass visor 500 of FIG. 5. As shown in FIG. 6, the attachment component 520b is clipped into engagement with a portion of a temple 554b of a pair of eyeglasses. Although not shown, a similar engagement would be employed between another attachment component and arm of the eyeglasses. In an implementation, a user may operate the attachment component 520b to transition it from an open position to a closed (or engaged) position, wherein it clips or otherwise couples to the temple 554b of the eyeglasses. An advantage of the embodiments of the present disclosure is achieved in the easy to use and universal (e.g., one size fits all) nature of the attachment components as it relates to a variety of eyewear. In addition, the body of the visor is shaped and configured to provide a physical overhang and protection to the lenses of the eyewear, while conforming to the general shape of the user's forehead to provide more complete protection from the elements.

Figure 7:
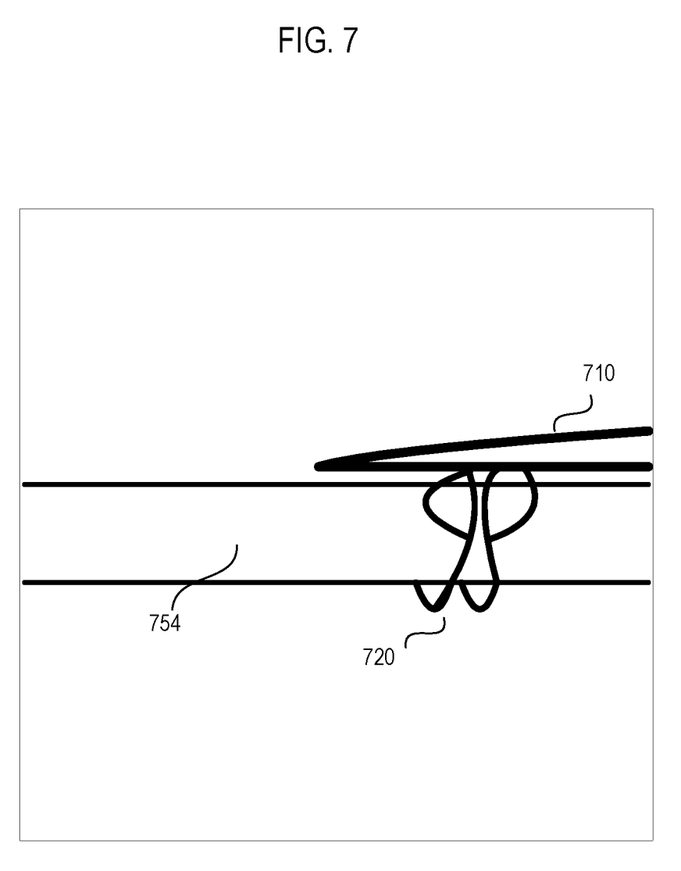
FIG. 7 shows a side view of a clip-type attachment component in a closed position and in a clipped engagement with an arm of a pair of eyeglasses.

FIG. 7 illustrates a side view of a portion of a body 710 of an example eyeglass visor attached to an arm 720 of a pair of eyeglasses by an attachment component 720. As shown in FIG. 7, the attachment component is a clip-type device in a closed position, such that the eyeglass visor is securely clipped or fastened to the eyeglasses.

Figure 8A:
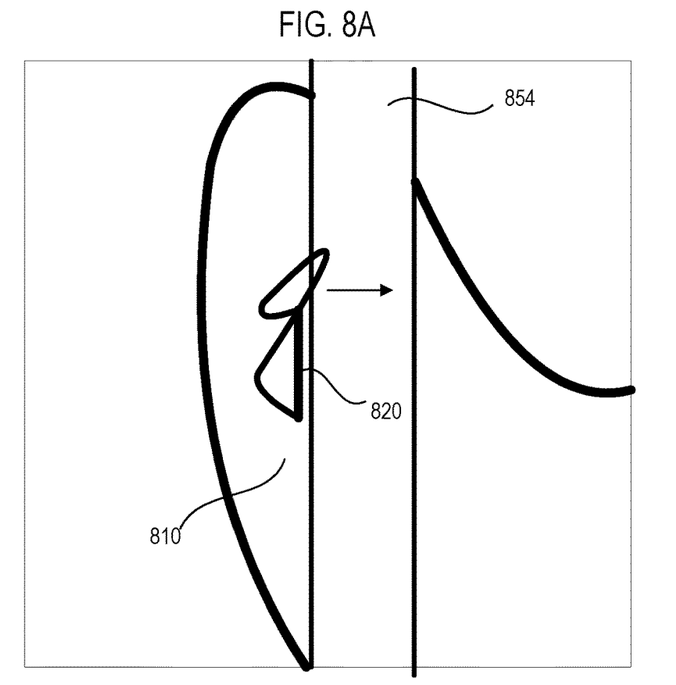
FIGS. 8A and 8B show a bottom view of a clip-type attachment component in an open position and a closed position, respectively.
Figure 8B:
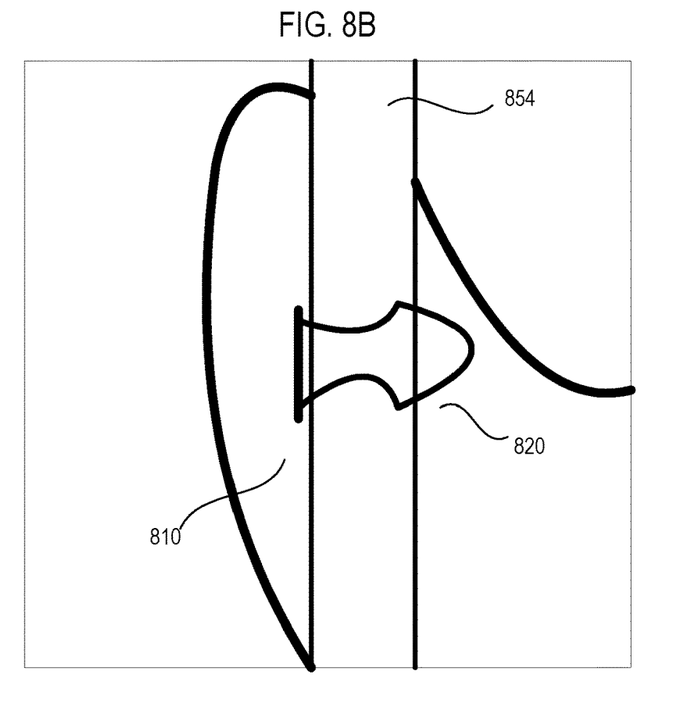

FIGS. 8A and 8B illustrates a bottom view of a portion of a body 810 of an example eyeglass visor including an attachment component 820 in the open position and the closed position, respectively. As shown in FIG. 8A, the clip-type attachment component 820 is in the open position. The attachment component 820 may be transitioned from the open position to the closed position by applying a force generally in the direction of the arrow shown in FIG. 8A. FIG. 8B shows the attachment component 820 after it has been transitioned may be transitioned from the in the open positions the open position attached to an arm 720 of a pair of eyeglasses by an attachment component 720. Advantageously, the body 810 of the eyeglass visor may be easily secured to the arms of the eyeglasses by operation of the attachment component to transition the attachment component from a first position to a second position. In the example shown, for a clip-type attachment component, the clip is transitioned from an open position to a closed position (e.g., in engagement around the arm of the eyeglasses). It is noted that other types of attachment components may be employed, such that the attachment component is configurable for transition from a first position (no engagement with the arm of the eyeglasses) to a second position (engagement with the arm of the eyeglasses).

It is to be understood that the exemplary embodiments are merely illustrative of the disclosure and that many variations of the above-described embodiments can be devised by one skilled in the art without departing from the scope of the disclosure. It is therefore intended that all such variations be included within the scope of the following claims and their equivalents.

What is claimed is:

1. An apparatus comprising:
   a body comprising a first end and a second end;
   a first attachment component arranged at the first end of the body, the first attachment component comprising a first spring-loaded tension clip comprising a first curved end portion configured to pivot from an open position to a closed position by a force provided by the first spring-loaded tension clip, wherein a first arm of eyeglasses is arranged within the first curved end portion of the first attachment component in the open position, and wherein the first attachment component transitions to the closed position to securely lock the first attachment component around and in attachment with the first arm of the eyeglasses, and wherein the first attachment component is configured to attach to a plurality of arms of different shapes and sizes; and
   a second attachment component arranged at the second end of the body, the second attachment component comprising a second spring-loaded tension clip comprising a second curved end portion configured to pivot from the open position to the closed position by a force provided by the second spring-loaded tension clip, wherein a second arm of the eyeglasses is arranged within the second curved end portion of the second attachment component in the open position, and wherein the second attachment component transitions to the closed position to securely lock the second attachment component around and in attachment with the second arm of the eyeglasses, and wherein the second attachment component is configured to attach to the plurality of arms of different shapes and sizes,
   wherein a portion of the body is positioned as a protective covering above a lens portion of the eyeglasses in view of the first spring-loaded tension clip in the closed position around and in attachment with the first arm and the second spring-loaded tension clip in the closed position around and in attachment with the second arm.

2. The apparatus of claim 1, wherein the first attachment moves to the open position in response to a force applied by a user to the first spring-loaded tension clip without removing the eyeglasses from the user's head.

3. The apparatus of claim 1, wherein the body comprises a crescent shape.

4. The apparatus of claim 1, wherein the first end of the body comprises a first hole and a second hole configured to accept a fastener to couple with the first attachment component.

5. The apparatus of claim 4, wherein the fastener comprises a tension string threaded between the first hole and the second hole of the first end of the body.

6. The apparatus of claim 5, wherein the tension string securely fastens the first attachment component to an underside of the body.

7. The apparatus of claim 1, wherein at least a portion of the body comprises water-resilient material.

8. An apparatus comprising:
   a body comprising a front portion, a first end and a second end forming a crescent shape;
   an adjustable first spring-loaded clip component fixed to an underside of the first end of the body, the adjustable first spring-loaded clip component comprising a first curved end portion configured to pivot from an open position to a closed position to adjustably couple to a plurality of portions of a first arm of eyeglasses;
   a first attachment component arranged at the first end of the body, the first attachment component comprising a first spring-loaded tension clip comprising a first curved end portion configured to pivot from an open position to a closed position by a force provided by the adjustable first spring-loaded clip, wherein a first arm of eyeglasses is arranged within the first curved end portion of the first attachment component in the open position, and wherein the first attachment component transitions to the closed position to securely lock the first attachment component around and in attachment with the first arm of the eyeglasses, and wherein the first attachment component is configured to attach to a plurality of arms of different shapes and sizes; and
   an adjustable second spring-loaded clip component fixed to the underside of the second end of the body, the adjustable second spring-loaded clip component comprising a second curved end portion configured to pivot from the open position to the closed position by a force provided by the second spring-loaded tension clip, wherein a second arm of the eyeglasses is arranged within the second curved end portion of the second attachment component in the open position, and wherein the second attachment component transitions to the closed position to securely lock the second attachment component around and in attachment with the second arm-of the eyeglasses, and wherein the second attachment component is configured to attach to the plurality of arms of different shapes and sizes;

wherein the portion of the body is positioned as a protective covering above a lens portion of the eyeglasses in view of the adjustable first spring-loaded clip component in the closed position around and in attachment with the first arm and the adjustable second spring-loaded clip component in the closed position around and in attachment with the second arm.

9. The apparatus of claim 8, wherein the first end of the body comprises a first hole and a second hole configured to accept a fastener to couple with the first clip component.

10. The apparatus of claim 9, wherein the fastener comprises a tension string threaded between the first hole and the second hole of the first end of the body.

* * * * *